Patented Feb. 20, 1923.

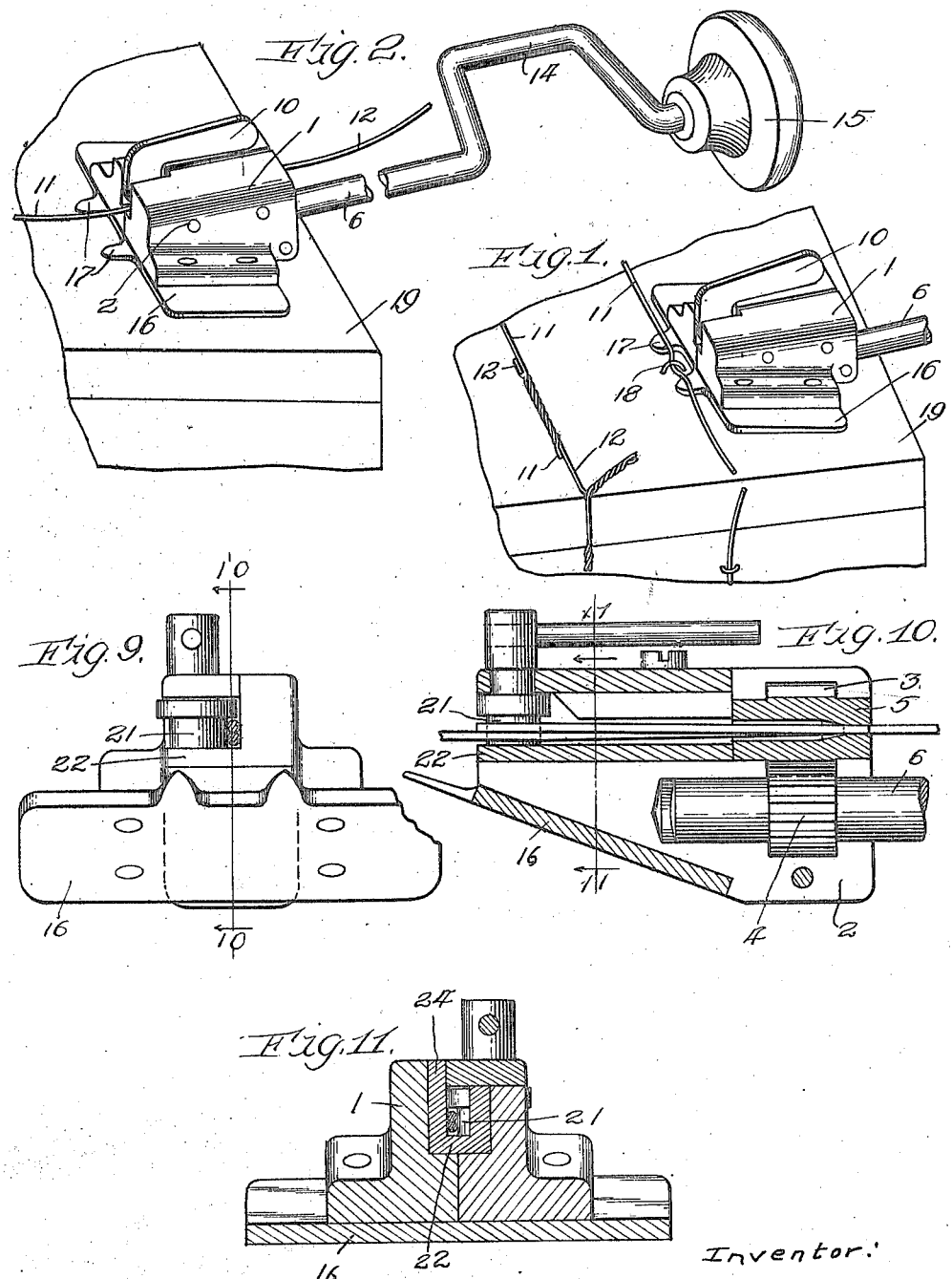

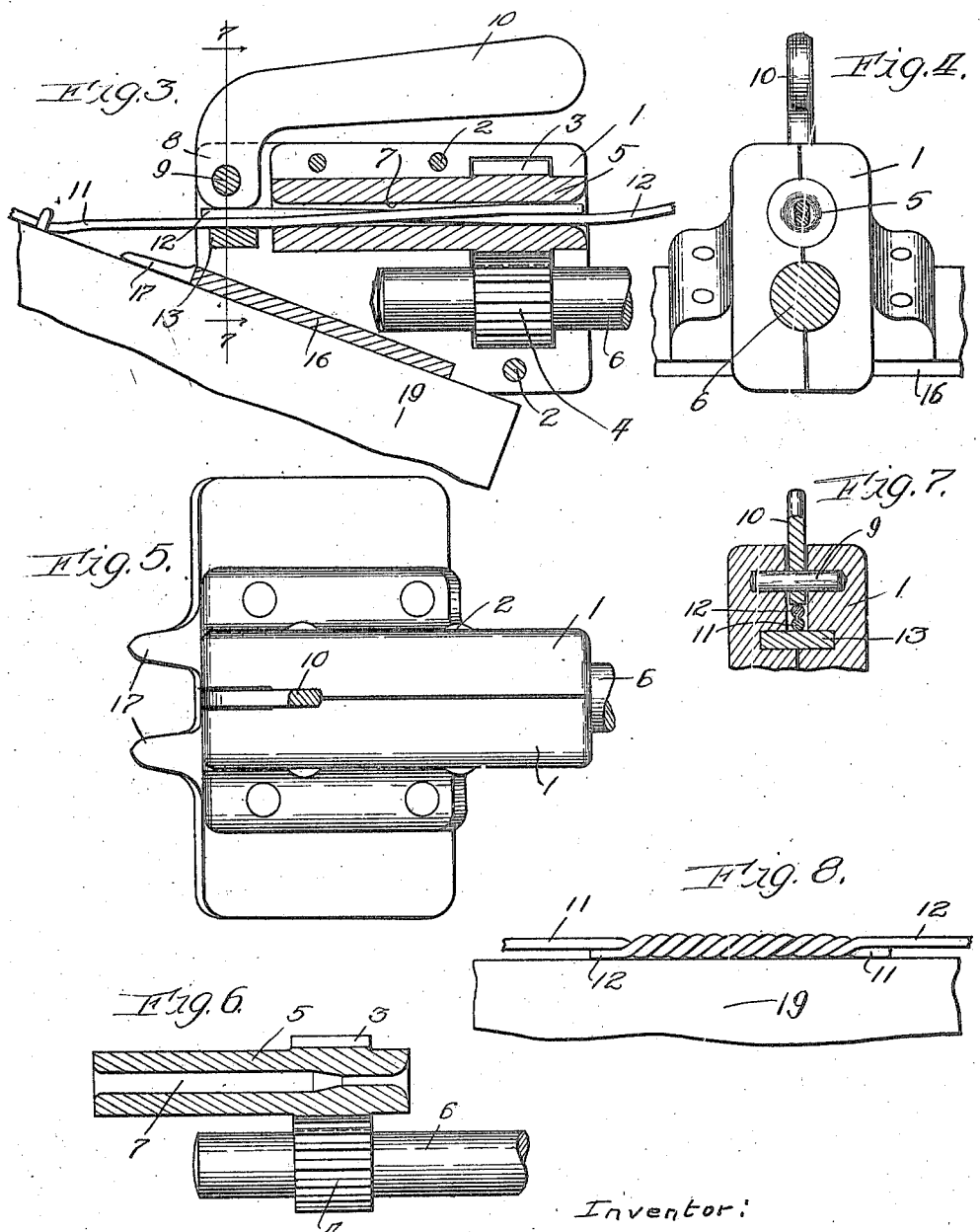

1,445,634

UNITED STATES PATENT OFFICE.

JOHN SHERMAN McCHESNEY, OF CHICAGO, ILLINOIS, ASSIGNOR, BY MESNE ASSIGNMENTS, TO CARY MANUFACTURING CO., OF BROOKLYN, NEW YORK, A CORPORATION OF NEW YORK.

WIRE-SPLICING TOOL.

Application filed March 31, 1919, Serial No. 286,241. Renewed August 14, 1922. Serial No. 581,842.

*To all whom it may concern:*

Be it known that I, JOHN SHERMAN MCCHESNEY, citizen of the United States, residing at Chicago, Illinois, have invented certain new and useful Improvements in a Wire-Splicing Tool; and I do hereby declare the following to be a full, clear, and exact description of the invention, such as will enable others skilled in the art to which it appertains to make and use the same.

My invention relates to appliances for intertwisting wires without holding them under tension, and for joining a pair of wires firmly by a splice which will be neat in appearance and which will maintain the adjoined wires substantially in longitudinal continuation of each other. Viewed in one of its more particular adaptations, my invention aims to provide a simple appliance for splicing an extension piece of wire to one of the wire bands on a so-called wire-bound box, so that this band may again be used effectively, also to equip the same tool so that it can be used for withdrawing a staple so as to permit a portion of the wire to be raised into a position in which an extension piece can conveniently be spliced to it with my appliance.

To permit the employing of lighter box sides, it has long been customary to reinforce the wooden sides by means of wire loops extending entirely around the box, the free ends of each loop being intertwisted at one edge of the box, as shown near the left hand of Fig. 1 of the accompanying drawings. To open such a box, these spliced joints at the ends of the wires are either cut off entirely, or untwisted, and even if they are untwisted, the terminal wire portions usually have been strained to such an extent that they cannot be rejoined into a splice of a dependable strength. Consequently, such wire-bound boxes have commonly been thrown away after a single use, although they might be in serviceable condition for repeated service, except for the lack of a strong connection between the wires, which then gap substantially as shown more to the right in Fig. 1. I have found that by simply splicing two relatively short pieces of wire to the free ends of each of the severed wire bands, the discarded box is restored to useful condition, as the tip portions of these extension wires, can then be intertwisted with each other in the usual manner.

In the embodiments illustrated, my invention aims to provide a simple and easily operated hand tool suitable for splicing extension wires to the ends of such wire bands; to provide a tool for this purpose which can easily be operated to afford a joint of ample strength without overstraining the wire, and to provide a tool which can readily be manipulated in such a manner as to leave the free tips of the splice turned between the box and adjacent portions of the wire band, thereby preventing these wire tips from catching on other wire bands when the boxes are slid upon one another. My invention also aims to provide means for disposing the operating part of the appliance in position for convenient manipulation, and to provide simple means for releasing a part of the wire to which the extension is to be joined, so that this part may be conveniently reached by my appliance.

In one of its more general aspects, my invention aims to provide simple and effective means for preventing both the kinking of a splice and irregularities in the formation of the splice while splicing two wires to each other without maintaining them under tension, thereby producing a splice which will be straight and uniform in the distribution of its twists. Furthermore, my invention aims to provide simple means for visually indicating the number of half-twists imparted to the adjoining wire portions, thereby enabling the operator of the appliance to gage the extent of the twisting with a view to avoiding both a looseness of the splice and an overstraining of the wire, and thereby also enabling him to dispose the free ends of the splice in desirable positions. Still further objects will appear from the following specification and from the accompanying drawings, in which—

Fig. 1 is a perspective view of a portion of a wire-bound box, showing my appliance in position for raising the end of a ruptured band to an accessible position, and also showing a new splice as made after extending another wire band with the aid of my appliance.

Fig. 2 is a perspective view of one embodiment of my invention, showing the same as it appears in use for extending a band on a wire-bound box.

Fig. 3 is a central and longitudinal section through the head of the tool of Fig. 2.

Fig. 4 is a rear view of the same, taken from the right hand end of Fig. 3.

Fig. 5 is a top view of the head of the same tool.

Fig. 6 is a fragmentary view of the forward end of the operating handle and of the wire twisting member geared to the same.

Fig. 7 is a transverse vertical section taken through Fig. 3 along the correspondingly numbered line.

Fig. 8 is an enlarged elevation of the splice made with my applicance, showing also a fragment of the adjacent side of the box.

Fig. 9 is a front elevation of another embodiment of my invention, namely one in which the straightness and uniformity of the twist is obtained by a non-rotating confining member.

Fig. 10 is a central and longitudinal section through Fig. 9 taken along the correspondingly numbered line after the twisting tube has been rotated a quarter turn.

Fig. 11 is a transverse section taken along the correspondingly numbered line in Fig. 10.

In the embodiment of Figs. 1 to 8, my invention includes a body member consisting of two counterpart portions 1 secured to each other by rivets 2. These body portions have counterpart recesses cooperating to form bores for housing a pair of intermeshed pinions 3 and 4, a tube 5 fast upon one of these pinions, and an end of a stem 6 fast upon the other pinion. The tube 5 has a main portion 7 of its bore cylindrical and of somewhat more than twice the diameter of the wire with which the tool is to be used. This bore is contracted and flattened at the rear end of the appliance (substantially as shown in Fig. 4) to a bore large enough to freely receive two overlapping wires, but too small to permit a relative lateral movement of the wires with respect to each other, so that these wires cannot twist around each other within this part of the bore. This flattened bore portion has a length exceeding the sum of the diameters of the two wires and preferably has this length considerably in excess of the sum of the diameters, so as to maintain the wires parallel to each other when they slide through the said flattened bore, thereby maintaining the adjacent exposed portions of the two wires parallel to each other and preventing them from twisting through this bore portion after the manner of the shank of the spiral drill. Forwardly of the tube 5, I provide wire-gripping means including a cam 8 pivoted on a pin 9 extending transversely of the appliance and having a handle 10 for manipulating the same. The cam portion of this lever extends through a slot in the forward end of the body member, which slot approximates the diameter of a single wire (as shown in Fig. 7), so that the sides of the slot will maintain two wires 11 and 12 above one another, while the shape of the cam 8 is such that a movement of the lever 10 to the position of Fig. 3 will clamp the overlapped wires against a jaw 13. This jaw is desirably made of hardened steel and may be held in position by entering recesses in the body halves 1 as shown in Figs. 3 and 7.

The stem 6 is equipped with suitable means for conveniently rotating the same, as for example a hand crank 14 disposed between the main portion of this stem and a freely rotatable knob 15 against which the user of the appliance is adapted to press. This shank 6 desirably extends at an angle to the base of the body member 1, which member is secured to a steel shoe 16 adapted to rest on the surface of a box or other support. This shoe has at its forward end a pair of prongs 17 adapted to be slid under a wire at opposite sides from a staple 18 (as shown in Fig. 1), so that the staple may be raised by pressing downward on the shank 6 and thereby tipping the head of the appliance upwardly about the rear edge of its base as a fulcrum. By providing my tool with a relatively long stem 6, I can readily afford such a leverage as to expedite the drawing of staples in this manner, thus enabling me to quickly free the end of a severed wire band on a wire bound box from the stapling for a sufficient length so that the same may be bent at an angle to the box 19, as shown in Fig. 3.

Having thus rendered one end of the wire band accessible, I next swing the cam lever 10 on my appliance to its aperture increasing position (as by swinging the handle 10 towards the left in Fig. 3), and slide the extension wire 12 through the flattened opening from the rear of the tool and entirely through the bore 7 to a position in which its free end is between the jaw 13 and the cam 8. Next, I slide my tool forward while inserting the free end of the wire 11 over the wire 12 until this wire 11 extends into the flattened rear end of the bore of the tube 5. Then I swing the handle 10 back to the position of Fig. 3, thereby clamping the overlapped wire portions between the cam 8 and the jaw 13. Thus arranged, it will be evident from Fig. 3 that the wires which are to be adjoined have portions longitudinally overlapping and clamped near the tip of one wire, while they are held against relative lateral or rotational movement adjacent to the tip of the other wire, although not gripped or restricted as to longitudinal movement except adjacent to the cam 8.

Upon rotating the stem 6 by means of the crank 14, the intermeshing pinions 4 and 3 rotate the tube 5, thereby causing the flattened bore portion of this tube to twist the two portions of the wire between this portion and the jaw 13. In doing so, the relatively small bore 7 connecting these parts will prevent a "hunting" or kinking of the twist during the making thereof, so that I avoid the irregular spacing and the unsightly bends which would be produced if the splice were not restricted. At the same time, since both wires are free to slide through the flattened end of the bore of the twisting tube, these wires can move longitudinally with respect to the twisting tube to permit a slight taking up of each wire during the making of the splice. Moreover, since I start with the free end of the wire 12 between the wire 11 and the box, and with the free end of the wire 11 above the wire 12, every odd number of half-turns will bring the free end of the wire 11 also between the other wire and the box. Consequently, by making an odd number of half-turns of the shank 6, I can readily cause the free ends of the splice to be disposed towards the box (as in Fig. 8) or in a position in which they will not catch on adjacent objects. So also, by rotating the shank for a predetermined number of half-turns, I can readily insure a splice of ample strength without overstraining the wire. Consequently, by simply instructing the user as to the number of half-turns which he is to impart to the shank of my appliance, I can readily enable even an inexperienced workman to effect a dependable splicing.

To simplify the manufacture, I desirably mount the cam lever on a pivot pin 9 which is journaled in corresponding bores in the two halves of the body member 1 when these are assembled as shown in Fig. 7. Likewise, I desirably provide similar socket formations for the side portions of the jaw 13, which jaw is desirably made of a harder material than the body member. However, I do not wish to be limited to the above described details of construction and arrangement, it being obvious that my appliance might be modified in many ways without departing from the spirit of my invention. For example, Figs. 9, 10 and 11 show another embodiment in which I employ a stationary channel 24 as the confining member for preventing a "hunting" or kinking of the twist during the twisting operation, and in which I employ an eccentric 21 for clamping the two wires against a side wall at the forward end of this channel. In this case, the confining channel member 22 is U-shaped in section and is desirably of harder material than the body member, as it is subjected to the frictional engagement of parts of the twist during the making of the latter. With this construction, the bottom and the two side walls of the channel are desirably spaced from the axis of the upper pinion by a distance approximating from one and one-quarter to one and one-half times the diameter of each of the two wires, thus making the effective bore of the channel between two and a half and three times the diameter of a single wire.

With either of these forms, the wire-gripping clamp is desirably so located that it will hold the wires symmetrically disposed with respect to the axis of the rotating pinion; or in other words, so that the two wires will initially be overlapped along the axis of this rotating pinion. With the parts thus arranged, there is no strain during the twisting which would tend to shift the axis of the twist, so that I reduce the amount of friction on the confining member (which in the first named embodiment is the rotating tube, and in the second embodiment is a stationary channel or guard member), and hence am able to produce a quite durable tool at a comparatively low cost. This friction is still further reduced in the embodiment of Figs. 1 to 8, since the twist-confining member rotates with the twisting wire portions, so that the friction is only longitudinal of this member.

Moreover, since the long operating stem of the appliance also affords a convenient lever for the staple-pulling portion of the same, my appliance can be quickly operated both for raising wires to conveniently accessible positions, and for thereafter splicing extensions to the same. To further increase the accessibility, I desirably mount the pinions so that their axes are inclined to the shoe 16, as for example, after the manner shown in the drawings. After completing the twist in each case, the clamping lever is loosened, and the tool can then be pulled off the twist and off the wires which are now spliced to each other, the extension wire 12 being then drawn clear through the tool.

I claim as my invention:

1. For intertwisting two longitudinally parallel wire portions, two relatively rotatable means spaced along the said wire portions, one thereof gripping the wires, the other thereof slidably housing the wires with a bore flattened to less than the sum of the diameters of the wires, and means fast with respect to one of the aforesaid means for affording peripheral restraint to the twist during its formation.

2. In an appliance for intertwisting two wire portions longitudinally overlapped with their tips directed in opposite directions, a pair of relatively rotatable members equipped with alined passage portions jointly housing the said wire portions; the said passage portions including two shaped for confining the adjacent portions of the wires to prevent relative rotation thereof, and a medial portion of a bore greater than the sum of the diameters of the two wire portions; and means for relatively rotating the said members.

3. For intertwisting two longitudinally parallel wire portions, two relatively rotatable means spaced along the said wire portions, one thereof gripping the wires, the other thereof slidably housing the wires with a bore flattened to less than the sum of the diameters of the wires, and means fast with respect to one of the aforesaid means for affording peripheral restraint to the twist during its formation, the said restraining means being spaced from the axis of the said flattened bore by a distance approximating the diameter of one of the wires.

4. In an appliance for intertwisting two wires, a rotatable tubular member whose bore includes a main portion formed for freely housing the intertwisted portion of the proposed splice and a second portion formed for slidably housing two parallel wire portions while preventing relative rotation thereof.

5. In an appliance for intertwisting longitudinally overlapped portions of two wires, relatively rotatable elements spaced by the length of the proposed twist and each arranged for preventing relative rotation of two parts of the overlapped wire portions, and means disposed between the said elements for limiting the departure of the resulting twist from the axis of the latter by a distance slightly larger than the diameter of one of the wires.

6. An appliance for intertwisting two longitudinally parallel wire portions, comprising two relatively rotatable means spaced along the said wire portions, the first thereof gripping the wires, the second thereof slidably housing the wires with a bore flattened to less than the sum of the diameters of the wires; means fast with respect to one of the said two means for affording peripheral restraint to the twist during its formation, and an operating member rotatably mounted on the first-named means and geared to the second-named means.

7. In an appliance for intertwisting longitudinally overlapped portions of two wires, a supporting member equipped for gripping the overlapped wire portions, a second member rotatably mounted on the supporting member and having a portion slidably engaging the overlapped wire portions at a distance from the said gripping; means disposed between the said gripping and the said portion of the rotatable member for limiting the departure of the resulting twist from the axis of the latter by a distance slightly larger than the diameter of one of the wires; an actuating member pivoted on the supporting member, and gearing connecting the actuating member with the supporting member.

8. In a wire twisting appliance, a supporting member, means for retaining a plurality of wires in side by side relation to each other and to preclude rotation of one wire relatively to the other, and a rotatable member provided with a wire receiving opening the cross sectional contour and dimensions of which effect the twisting of the wires and permit a sliding movement of said twisted wires within said member during the rotation thereof.

9. In a wire twisting appliance, a supporting member, means for gripping a plurality of wires positioned in side by side relation and operating to preclude the rotation of either wire relatively to the other, a tubular member having an opening of a diameter to receive the side by side positioned wires and to permit sliding of the resulting twist within said member, and means for imparting rotative movement to said tubular member with respect to said gripping means.

10. In a wire twisting appliance, means for gripping a plurality of wires in side by side relation and operating to restrain said wires from rotation with respect to each other, a tubular member provided with a single opening through which the plurality of wires are adapted to pass and within which said wires are adapted to slide during the formation of the twist, and means for imparting rotative movement to the tubular member relatively to the gripping means, said gripping means and the tubular member being relatively spaced along the side by side positioned wire portions.

11. In a wire twisting appliance, a supporting member, wire retaining means thereon, a tubular member having a single opening within which a plurality of wires are free to extend and to slide therein, and means for imparting rotative movement to the tubular member with respect to said wire retaining means, the under surface of said supporting member being at an angle to the plane of the rotatable member and the wire retaining means.

Signed at Chicago, March 26th, 1919.

JOHN SHERMAN McCHESNEY.